(12) United States Patent
Beutler et al.

(10) Patent No.: US 9,776,095 B2
(45) Date of Patent: Oct. 3, 2017

(54) RESTRAINT SYSTEM FOR USE IN A VEHICLE

(71) Applicant: Jörg Beutler, Holzkirchen (DE)

(72) Inventors: Jörg Beutler, Holzkirchen (DE); Thomas Günther, Lößnitz (DE); Christian Schreiter, Venusberg (DE)

(73) Assignee: Jörg Beutler, Holzkirchen (DE)

( * ) Notice: Subject to any disclaimer, the term of this patent is extended or adjusted under 35 U.S.C. 154(b) by 72 days.

(21) Appl. No.: 14/688,625

(22) Filed: Apr. 16, 2015

(65) Prior Publication Data

US 2015/0298646 A1 Oct. 22, 2015

(30) Foreign Application Priority Data

Apr. 16, 2014 (EP) .................................... 14165026

(51) Int. Cl.
*B60R 22/00* (2006.01)
*A63G 7/00* (2006.01)
(Continued)

(52) U.S. Cl.
CPC ............ *A63G 7/00* (2013.01); *B60R 22/1952* (2013.01); *B60R 22/357* (2013.01); *B60R 2021/0097* (2013.01)

(58) Field of Classification Search
CPC ............ B60R 22/1951; B60R 22/1952; B60R 22/1955; B60R 22/357
(Continued)

(56) References Cited

U.S. PATENT DOCUMENTS 3,294,447 A * 12/1966 Riley .................... B60R 22/357
24/609
3,319,998 A * 5/1967 Boland ................. B60R 22/357
188/82.3
(Continued)

FOREIGN PATENT DOCUMENTS

CN 1530265 A 9/2004
CN 1876446 A 12/2006
(Continued)

OTHER PUBLICATIONS

Sep. 12, 2014, Examination Report from the European Patent Office in European Patent Application No. 14165026.7, which this U.S. application claims the benefit of priority.
(Continued)

*Primary Examiner* — Philip Gabler
(74) *Attorney, Agent, or Firm* — Kolisch Hartwell, P.C.

(57) ABSTRACT

A restraint system for use in a vehicle may include a seat; a belt system having at least one belt and at least one belt-adjusting mechanism; and at least one buckle. The belt-adjusting mechanism may be disposed at a first side of the seat and the buckle may be disposed at a second side of the seat. An end portion of the belt may be connected to the belt-adjusting mechanism; and the belt system may have a locking member for locking with the buckle. The restraint system may also include a belt pretensioner that includes a force transmission member; and an actuator configured to actuate the force transmission member for tightening the force transmission member and/or the belt. The actuator may be configured to be actuated and/or triggered by an operator.

20 Claims, 2 Drawing Sheets

(51) Int. Cl.
*B60R 22/357* (2006.01)
*B60R 22/195* (2006.01)
*B60R 21/00* (2006.01)

(58) Field of Classification Search
USPC .................. 297/474, 475, 476, 477, 479
See application file for complete search history.

(56) References Cited

U.S. PATENT DOCUMENTS

| | | | | |
|---|---|---|---|---|
| 4,305,618 A | * | 12/1981 | Molnar | B60R 22/357 |
| | | | | 242/384.7 |
| 4,720,148 A | * | 1/1988 | Anthony | B60R 22/357 |
| | | | | 297/474 |
| 4,846,498 A | * | 7/1989 | Fohl | B60R 22/205 |
| | | | | 280/801.2 |
| 5,031,962 A | * | 7/1991 | Lee | A44B 11/2557 |
| | | | | 297/468 |
| 5,308,148 A | * | 5/1994 | Peterson | B60N 2/24 |
| | | | | 297/468 |
| 5,707,080 A | | 1/1998 | Isaji et al. | |
| 6,220,171 B1 | * | 4/2001 | Hettema | A63G 7/00 |
| | | | | 104/53 |
| 6,698,677 B1 | * | 3/2004 | Happ | B60R 22/4633 |
| | | | | 242/374 |
| 7,887,096 B2 | * | 2/2011 | Kohama | B60R 22/1952 |
| | | | | 180/268 |
| 7,914,384 B2 | | 3/2011 | Roodenburg et al. | |
| 8,287,049 B2 | * | 10/2012 | Kohama | B60R 22/1955 |
| | | | | 297/479 |
| 8,678,510 B2 | * | 3/2014 | Masutani | B60R 22/1955 |
| | | | | 297/216.1 |
| 2004/0251722 A1 | | 12/2004 | Boyle | |
| 2008/0169634 A1 | * | 7/2008 | Zhou | B60R 22/1951 |
| | | | | 280/806 |
| 2015/0158590 A1 | * | 6/2015 | Gehret | B64D 11/062 |
| | | | | 297/474 |

FOREIGN PATENT DOCUMENTS

| | | | | |
|---|---|---|---|---|
| CN | 101282772 A | | 10/2008 | |
| DE | 19543393 A1 | | 6/1996 | |
| DE | 10239891 A2 | | 3/2004 | |
| GB | 1311978 A | * | 3/1973 | ........... B60R 22/357 |
| WO | 2005042308 A2 | | 5/2005 | |

OTHER PUBLICATIONS

Nov. 16, 2016 Office action from The State Intellectual Property Office of China, in Application No. 201510179574.4, which shares the same benefit of priority as this U.S. application.

* cited by examiner

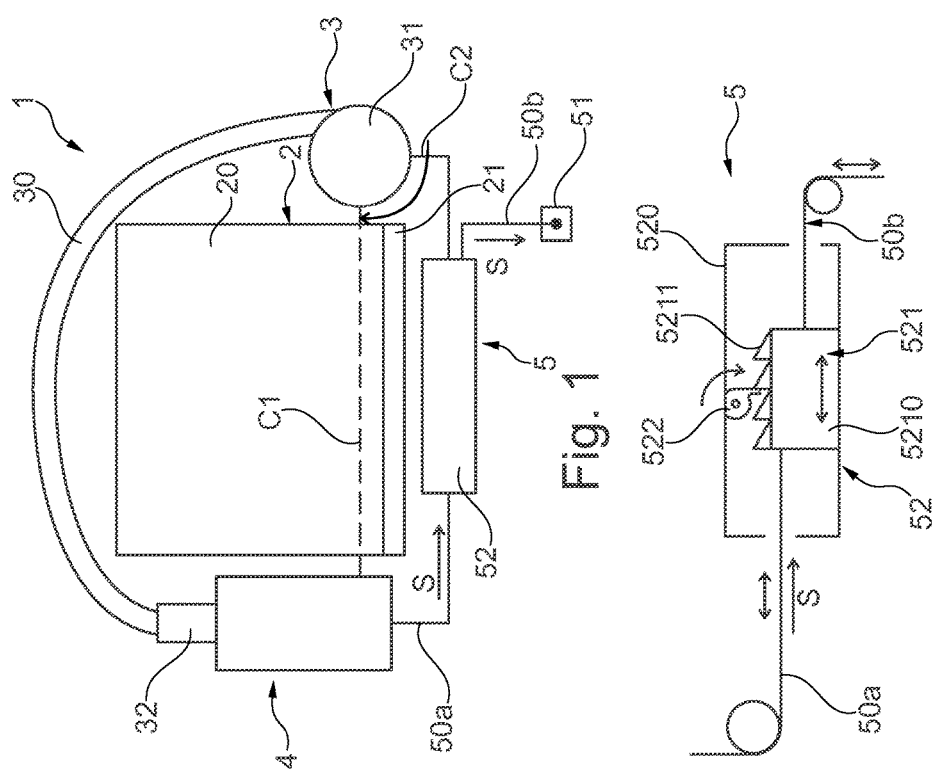

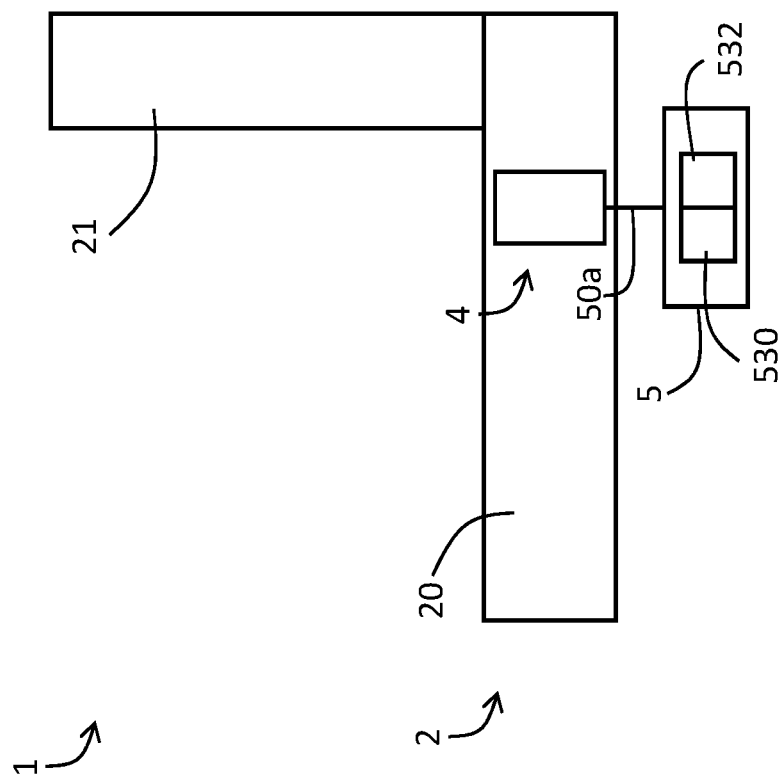

RESTRAINT SYSTEM FOR USE IN A VEHICLE

CROSS-REFERENCE TO RELATED APPLICATION

This application claims priority to European Patent Application No. 14165026.7, filed Apr. 16, 2014, which is hereby incorporated by reference.

BACKGROUND

Fairground rides for amusement purposes come in different variations. In addition to appealing to and thrilling the passenger, fairground rides are designed primarily with a focus on safety aspects, such as the use of a suitable restraint system.

Conventional belt systems come in the form of rigid bars or in the form of belt systems, such as are used inter alia in everyday modes of transport, such as automobiles and airplanes. An example of a system commonly used in roller coasters is disclosed in DE 10239891A1.

However, conventional systems often do not lend themselves particularly well to amusement vehicles, as the occupants buckle up relatively quickly, for a short time, and without paying much attention. For this reason, it is often not enough to rely on the passenger to put on and adjust the tightness of their own belt. In addition, there is a danger that the passenger not tighten the belt enough and therefore be at risk during the ride. In extreme cases, the belt will not be completely closed or will open during the ride. In the case of fully automatic restraint systems, which lock only up to a certain resistance, it is possible for a passenger to be not sitting properly while fastening the belt, as a result of which the restraint device (e.g., bar) is too loose. Other systems, which close to a certain position independently of the passenger (such as the bar in conventional chair lifts) do not take account of the different statures of passengers.

SUMMARY

One or more embodiments of the present disclosure relate to a restraint system for an (especially rail-based) amusement ride vehicle, especially a roller coaster vehicle, that may comprise: a seat; a belt system with a belt and a belt-adjusting mechanism; and a buckle. The belt-adjusting mechanism may be disposed on a first side of the seat, and the buckle may be disposed on a second side of the seat. An end portion of the belt may be connected to the belt-adjusting mechanism. The belt system may include a locking member for locking with the buckle. The restraint system may have a pretensioner.

An object of one or more embodiments of the present disclosure is to provide a restraint system for an amusement vehicle that ensures reliable buckling up and reliable protection of the vehicle occupants.

One or more embodiments of the present disclosure of a restraint system for an (especially rail-based) amusement ride vehicle, especially a roller coaster vehicle, comprise: a seat; a belt system with a belt and a belt-adjusting mechanism; and at least one buckle; wherein the belt-adjusting mechanism is disposed on a first side of the seat and the buckle is disposed on a second side of the seat; an end portion of the belt is connected to the belt-adjusting mechanism; the belt system includes a locking member for locking with the buckle; the restraint system has a pretensioner comprising a force-transmission member and an actuating device for actuating the force-transmission member for the purpose of tightening the force-transmission member and/or the belt; wherein the actuating device can be actuated and/or triggered by an operator.

Unlike the case for cars usually found participating in daily traffic, with the amusement ride of one or more embodiments of the present disclosure, it is not to be left to the user to decide whether and in what way they use a safety system, since the operator has (partial) responsibility for passenger safety. The passenger restraint system therefore makes it possible for the passenger to put on the restraint system. In addition, however, the operator, without the influence of the passenger, can adjust the settings of the restraint system, e.g., the tension of the belt, and retain these settings for the duration of use. In this way, components of the system can be locked or blocked such that they cannot be opened or disabled by the user during the ride. At the end of use, the operator can unlock the components and/or disable the safety system. The pretensioner is configured as a device which is separate from the buckle and from the belt system. In other words, the pretensioner is operated elsewhere by (manual) actuation and possibly where it cannot be accessed by the user. The operation of the pretensioner has inter alia the advantage that a lack of resistance up until it stops can serve to detect if the tongue plate has not been inserted at all or not inserted properly into the buckle.

In one or more embodiments of the present disclosure, the belt can be implemented in different ways and should be understood in a broad sense such that belts can comprise one or more straps/ropes, over-moulded ropes, at least one elastic component, e.g., a flexible plastic strap. In specific embodiments, the belt system can be of a redundant design.

In one or more embodiments of the present disclosure, the restraint system can include a locking mechanism which is configured such that the locking member of the belt system in the buckle can be locked and/or unlocked in coordination with the belt-adjusting mechanism. The belt-adjusting mechanism is then fully locked and acts not just when the belt is suddenly withdrawn, as is the case in normal passenger vehicles.

In one or more embodiments of the present disclosure, the restraint system can in particular comprise a locking mechanism which acts from both sides on the locking member of the belt system and/or the buckle and the belt-adjusting mechanism.

In one or more embodiments of the present disclosure, the locking takes place on the first side of the seat—between tongue plate and buckle—simultaneously or after a slight delay, but in coordination with the locking on the second side—in other words the locking of the belt-adjusting mechanism. Locking can be triggered externally or be triggered by the locking, e.g., of the tongue plate in the buckle. The double-sided locking can also be triggered by an actuation on the part of the operator, e.g., by actuation of the re-tightening device. The same applies to unlocking.

In one or more embodiments of the present disclosure, the restraint system can be configured such that the belt-adjusting mechanism becomes or is blocked if the buckle becomes locked, and/or the belt-adjusting mechanism becomes or is unlocked if the buckle is opened.

In one or more embodiments of the present disclosure, the buckle comprises in particular a housing and a receptacle, which can be disposed so as to be movably guided in the housing. The receptacle can, e.g., be linearly movable in a guideway of the housing. Depending on the relative position of the receptacle in the housing, release of the tongue plate from the receptacle can be enabled or blocked. However, it would also be possible within the scope of one or more embodiments of the present disclosure to tighten the belt on the other side, e.g., by further winding up the belt in the belt-adjusting mechanism or by pulling on the belt-adjusting mechanism in a direction in which the belt is further tightened.

In one or more embodiments of the present disclosure, the receptacle is connected in particular to the force-transmission member. Thus, said force-transmission member in the specific embodiment having a movable receptacle retracts said receptacle to a greater or lesser extent into the housing during tightening by the tightening device.

In one or more embodiments of the present disclosure, the pretensioner has a backstop for blocking at least one direction of movement of the force transmission member. The detent can alternatively be configured such that the buckle can engage directly with a corresponding lock (or in the case of belt pretensioning via latching of the belt-adjusting mechanism), while the force transmission member can be left unsecured.

In one or more embodiments of the present disclosure, the backstop can comprise a position element which is connected to the force transmission member, and a locking element such as a pawl for engagement with the position element. The position element is disposed so as to be movably guided in a housing of the backstop. It has, for example, a tooth profile or sawtooth profile, such that, during engagement of a pawl disposed at the housing, movement is possible in the tightening direction only. The pawl can be unlocked to relax the belt. It can, as is disclosed in the prior art, block in one direction and, in the other, permit a movement of the position element, for example, through a force exerted against a spring force.

In one or more embodiments of the present disclosure, the backstop can be unlocked to relax the belt. The locking or unlocking of the backstop can be coupled to the locking/unlocking mechanism of the belt retractor and/or the buckle so that locking/unlocking operations can be facilitated and/or triggered in coordination with and/or in temporal/causal dependence of each other.

In one or more embodiments of the present disclosure, the coupling can be configured mechanically, electrically, via a signal line or other signal connection.

In one or more embodiments of the present disclosure, the pretensioner preferably comprises a Bowden cable. It is part of the force transmission member. When the actuating apparatus is actuated, a cable in the Bowden cable moves the positioning member, which in turn retracts the receptacle into the housing of the buckle. However, the force transmission member can also comprise at least a rope, a chain, a rod, cable, etc. In detail, however, belt tightening can also be carried out in a different manner, e.g. as described above. The pretensioner can preferably also comprise a crank and/or motor, possibly with gear wheel and/or belt, with the aid of which the tightening operation is performed or transferred to the belt.

In one or more embodiments of the present disclosure, the actuating device can be configured for manual re-tightening of the belt or manual triggering of the tightening operation, such as a lever, pedal or pull rope. However, in the context of one or more embodiments of the present disclosure, manually triggered tightening only, e.g., at the press of a button, by way of an electric motor, is also possible. The process of safeguarding a user of the vehicle comprises various operations that are performed or triggered sequentially, at the same time and/or in dependence and/or in coordination simultaneously or sequentially. These operations are the attaching and the locking of the tongue plate to the receptacle of the buckle, the locking of the tongue plate at the buckle, the locking of the belt retractor and pretensioning by way of the pretensioner. These operations can trigger each other, e.g., mechanically, or a first operation can be triggered manually which then automatically triggers the following operations. The buckle 4 can only be opened again by an unlocking mechanism out of reach of the passenger.

In one or more embodiments of the present disclosure, the pretensioner can essentially be disposed at a side facing away from a seat area of the seat, that is, to the rear and/or beneath the seat. The pretensioner and/or the backstop can be disposed in particular at the rear side of the backrest of the seat.

In one or more embodiments of the present disclosure, the belt-adjusting mechanism is configured in particular as a belt retractor. However, it can be configured in other ways to preadjust the length of the belt as soon as the belt is closed. In this first adjustment, the belt length for encompassing the passenger is adjusted, e.g., by the retractor, which, e.g., through the force of a spring, rolls up the belt, or by way of a motor, or by an elastic member such as a rubber band, helical spring, which can also act linearly, or by a linear motor. After the first adjustment, the belt can then be arrested in the belt-adjusting mechanism.

In one or more embodiments of the present disclosure, a configuration in which the belt-adjusting mechanism and buckle are combined is also conceivable. First, the passenger makes the first length adjustment by inserting the belt into the buckle and locking it. He can, e.g., fully extend the belt from a belt collector disposed on a side facing away from the buckle and then ratchet the belt tongue into the buckle until the belt is taut (first adjustment). Re-tightening as the second adjustment is done by the operator, as described above. Alternatively, the apparatus could also be configured such that the operator directly retracts the belt further into the buckle directly at the ratchet. The force transmission member with actuating device, e.g., the end of the belt configured as a handle, would be integrated directly into the belt in this connection.

Protection is sought for one or more of these characteristics, both individually and in combinations with each other.

BRIEF DESCRIPTION OF THE FIGURES

Further advantages and characteristics of one or more embodiments of the present disclosure will become apparent from the description of one or more embodiments of the present disclosure with reference to the figures.

FIG. 1 is a plan view of an embodiment of a restraint system in accordance with the present disclosure.

FIGS. 2a, 2b are detailed views of an embodiment of a first component in accordance with the present disclosure.

FIG. 3 is a detailed view of an embodiment of a second component in accordance with the present disclosure.

FIG. 4 is a side view of the restraint system of FIG. 1 showing a belt pretensioner disposed beneath the seat.

DETAILED DESCRIPTION

The embodiment described below relates to a restraint system for use in an amusement vehicle, e.g., a roller coaster vehicle.

As shown in FIG. 1, an embodiment of restraint system 1 for an amusement vehicle comprises a seat 2 for a user with a seat area 20 and a backrest 21. A belt system 3 has a belt 30 (e.g., lap belt), a belt retractor 31 and a tongue plate 32 for insertion into and locking in a buckle 4.

The buckle 4 is fixed to the seat 2, e.g., to the substructure of the seat 2 or to a first side of the seat 2 on another part of the vehicle. The belt retractor 31 is attached on a second (opposite the first side) side of the seat 2 to the seat 2 or to the vehicle.

In addition, a locking mechanism is provided which is configured such that the buckle 4 and the belt retractor 31 can be locked on both sides and at the same time. The belt retractor 31 thereby becomes blocked upon insertion of the tongue plate 32 into the buckle 4. The belt 30 is thus fixed and only upon entry into the station will be unlocked again via a slide control and the like, such that the tongue plate 32 can be removed from the buckle 4 and the belt retractor 31 winds up the loosened belt 30.

The belt 30 blocked in the buckle 4 can be re-tightened by the operator via a special mechanism 5 (pretensioner and/or re-tightening mechanism), e.g., if the passenger was not sitting in a straight position when putting on the belt and the belt 30 was consequently too loose. The pretensioner 5 has a force transmission member 50, e.g., a chain, a cable, a rope, a rod or the like that transmits a tightening force onto the tongue plate 32 and thus onto the belt 30. The force transmission member 50 can comprise several sub-members 50a, 50b, between which other components are disposed or are connected to other components. The force transmission member 50 and/or at least sub-members/sub-sections 50a, 50b of the force transmission member 50 may be configured as a Bowden cable.

The force transmission member 50 is actuated via an actuator 51, which can be operated manually by the operator, e.g., to perform the belt-tightening operation. The actuator 51 can, for example, be a lever which is turned to produce a tightening force.

The pretensioner 5 also has a backstop 52 which prevents the tightened force transmission member 50 from relaxing against the tightening direction S and the belt 30 can thus be loosened. The backstop 52 can only be unlocked by the operator, e.g., if the ride is finished, or automatically, e.g., via a slide control with a slide attached to the rail (especially in the station area).

The connections C1 and/or C2, which may be mechanical, electronic, or pure signalling pathways, ensure that the belt retractor 31 and the buckle 4 can be locked or unlocked in coordination. Coordinated locking and/or unlocking can be realized by a comparable connection C2 between the belt retractor 31 and the pretensioner 5, whereby, in this embodiment, the state of the pretensioner 5 determines the state (locking or unlocking) of the retractor 31.

In one example, by pulling a positioning member 521 (see FIG. 3), an unlocking plate (not shown) is moved that releases a pawl (not shown) via a mechanism C2, which blocks the belt retractor 31. Alternatively, pressing of the tongue plate 32 into the buckle 4 by the passenger (see C1) could trigger this mechanism.

FIG. 2a shows the buckle 4 with inserted tongue plate 32 in a first tightened and locked state while FIG. 2b shows the buckle 4 with inserted tongue plate 32 in a second relaxed and unlocked state.

The buckle 4 comprises a housing 40 which is fixed in position at the seat or at the vehicle. Disposed in the housing 40 is a movable receptacle 41 for receiving the tongue plate 32. The receptacle 41 is movably guided in a guideway at least between a first position (state of maximum tightness) and a second position (state of maximum relaxation). This movability is indicated by double-headed arrows. For limiting of the movement, corresponding stops may be provided. The receptacle 41 is connected to one end of the force transmission member 50. Said member extends via a deflection element 53 into the backstop 52 (see FIG. 1).

FIG. 2a shows the receptacle 41 pulled into the housing 40 in the tightening direction S. The belt 30 is thereby tightened. In FIG. 2b, the receptacle 41 is moved against the R tightening direction S to the distal end of the housing 40. The belt 30 is thereby relaxed.

The receptacle 41 has a locking mechanism 410 which, from a certain position of the receptacle in the housing 40, locks the tongue plate 32 and cannot be operated by the user whereas the locking mechanism 410 in a second position can be actuated by the user for the purpose of unlocking. In operation, the passenger presses the belt tongue 32 with the receptacle 41 down and into the housing 40 into a minimum locking position such that the tongue plate 32 cannot be removed. Re-tightening by way of the belt pretensioner 5 then occurs.

In FIG. 3, the belt pretensioner 5 is shown in more detail. The belt pretensioner 5 comprises the force transmission member 50 (e.g., chain, cable, etc.) and the backstop 52. The backstop 52 comprises a housing 520 and a position member 521 movably guided and disposed in the housing 520, said position member being configured as a milling block. The position element 521 is connected to the force transmission member 50 such that the force applied by the actuator 51 (see FIG. 1) is transmitted to the receptacle 41 via the position member 521. The position element 521 has a base body 5210, and toothing, e.g., a saw-tooth profile 5211, which is configured such that a locking member 522, such as a pawl, locks the position element 521 so that this is movable only in the tightening direction S, but not counter to the tightening direction S. The milling block 521 sits movably in a guideway of the housing 50 and is pulled away into the re-tightening position by the operator via the force transmission member until the belt 30 is taut. A movement counter to the tightening direction S is possible in the relaxation operation only if the operator has unlocked the locking member 522 and/or this has been automatically unlocked to relax the belt 30.

One or more embodiments of the present disclosure relate to a restraint system 1 for an amusement ride vehicle which may comprise a seat 2 for a user with a seat area 20 and a backrest 21. A belt system 3 may have a belt 30 (e.g., lap belt), a belt retractor 31 and a tongue plate 32 for insertion into and locking in a buckle 4. In addition, a locking mechanism may be provided which is configured such that the buckle 4 and the belt retractor 31 can be locked on both sides and at the same time. The blocked belt 30 can then be re-tightened (pretensioner or re-tightening mechanism) by the operator via a special mechanism 5.

In FIG. 4, belt pretensioner 5 of restraint system 1 is disposed beneath seat 2. In particular, the belt pretensioner is disposed beneath seat portion 20 and backrest 21. Buckle 4 is connected to the belt pretensioner via transmission member 50a. Belt pretensioner 5 may include at least one of a crank 530 and a motor 532.

One or more embodiments of the present disclosure may include one or more of the following concepts:

A. Restraint system (1) for use in a vehicle, especially an amusement vehicle, comprising: a seat (2); a belt system (3) having at least one belt (30) and at least one belt-adjusting mechanism (31); and at least one buckle (4); wherein the belt-adjusting mechanism (31) is disposed at a first side of the seat (2) and the buckle (4) is disposed at a second side of the seat (2); an end portion of the belt (30) is connected to the belt-adjusting mechanism (31); and the belt system (3) has a locking member (32) for locking with the buckle (4); characterised in that the restraint system (1) has a belt pretensioner (5), which comprises: a force transmission member (50); and an actuator (51) for actuating the force transmission member (50) for tightening the force transmission member (50) and/or the belt (30); wherein the actuator (51) can be actuated and/or triggered by an operator.

B. Restraint system (1) according to Paragraph A, characterised in that the restraint system (1) has a locking mechanism which is configured such that the locking member (32) of the belt system (3) in the buckle (4) can be locked and/or unlocked in coordination with the belt-adjusting mechanism (31).

C. Restraint system (1) according to Paragraph A, characterised in that the restraint system (1) has a locking mechanism which acts from both sides on the locking member (32) of the belt system (3) and/or the buckle (4) and the belt-adjusting mechanism (31).

D. Restraint system (1) according to any of the preceding Paragraphs, characterised in that the restraint system (1) is configured such that the belt-adjusting mechanism (31) becomes or is blocked if the buckle (4) becomes locked, and/or the belt-adjusting mechanism (31) becomes or is unlocked if the buckle (4) is opened.

E. Restraint system (1) according to any of the preceding Paragraphs, characterised in that the buckle (4) comprises a housing (40) and a receptacle (41), which can be disposed so as to be movably guided in the housing (40).

F. Restraint system (1) according to Paragraph E, characterised in that the receptacle (41) can be connected to the force transmission member (5).

G. Restraint system (1) according to any of the preceding Paragraphs, characterised in that the pretensioner (5) comprises a backstop (52) for blocking at least one direction of movement of the force transmission member (50).

H. Restraint system (1) according to Paragraph G, characterised in that the backstop (52) comprises a position element (521) which is connected to the force transmission member, and a locking element, such as a pawl (522), for engagement with the position element (521).

I. Restraint system (1) according to either Paragraphs G or H, characterised in that the backstop (52) for relaxing the belt (30) can be unlocked.

J. Restraint system (1) according to either Paragraphs G to I, characterised in that the pretensioner (5) essentially is disposed at a side facing away from a seat area (20) of the seat (2), that is, to the rear and/or beneath the seat (2).

K. Restraint system (1) according to any of the preceding Paragraphs, characterised in that the pretensioner (5) comprises a Bowden cable, a chain, a rope, a cable, and/or a rod.

L. Restraint system (1) according to any of the preceding Paragraphs, characterised in that the pretensioner (5) comprises a crank and/or a motor, possibly with toothed gear and/or belt.

M. Restraint system (1) according to any of the preceding Paragraphs, characterised in that the actuator (51) is configured for manual re-tightening of the belt (30).

N. Restraint system (1) according to any of the preceding Paragraph, characterised in that the belt-adjusting mechanism (31) is configured as a belt retractor.

What is claimed is:

1. A restraint system for use in a vehicle, comprising: a seat; a belt system having at least one belt and at least one belt-adjusting mechanism; and at least one buckle;
wherein the at least one belt-adjusting mechanism is disposed at a first side of the seat and the at least one buckle is disposed at a second side of the seat;
an end portion of the at least one belt is connected to the at least one belt-adjusting mechanism; and
the belt system has a locking member for locking with the at least one buckle;
wherein the at least one belt-adjusting mechanism is configured to preadjust the at least one belt to a first tension;
further wherein the restraint system has a belt pretensioner, which comprises: a force transmission member; and an actuator configured to actuate the force transmission member for tightening the force transmission member and/or the at least one belt to a second tension greater than the first tension;
the actuator being configured to be actuated and/or triggered by an operator.

2. The restraint system in accordance with claim 1, wherein the restraint system has a locking mechanism which is configured such that the locking member of the belt system in the at least one buckle can be locked and/or unlocked in coordination with the at least one belt-adjusting mechanism.

3. The restraint system in accordance with claim 1, wherein the restraint system has a locking mechanism which acts on both the at least one buckle and the at least one belt-adjusting mechanism.

4. The restraint system in accordance with claim 1, wherein the restraint system is configured such that the at least one belt-adjusting mechanism becomes or is blocked if the at least one buckle becomes locked, and/or the at least one belt-adjusting mechanism becomes or is unlocked if the at least one buckle is disengaged from a tongue plate.

5. The restraint system in accordance with claim 1, wherein the at least one buckle comprises a housing and a receptacle, the receptacle being disposed so as to be movably guided in the housing.

6. The restraint system in accordance with claim 5, wherein the receptacle is connected to the force transmission member.

7. The restraint system in accordance with claim 1, wherein the belt pretensioner comprises a backstop configured to block at least one direction of movement of the force transmission member.

8. The restraint system in accordance with claim 7, wherein the backstop comprises a position element which is connected to the force transmission member, and a locking element configured for engagement with the position element.

9. The restraint system in accordance with claim 8, wherein the locking element is a pawl.

10. The restraint system in accordance with claim 7, wherein the backstop can be unlocked and therefore allow movement of the force transmission member in the at least one direction.

11. The restraint system in accordance with claim 1, wherein the belt pretensioner is disposed at a side facing away from a seat area of the seat that is to a rear of the seat.

12. The restraint system in accordance with claim 1, wherein the belt pretensioner comprises at least one of a Bowden cable, a chain, a rope, a cable, and a rod.

13. The restraint system in accordance with claim 1, wherein the belt pretensioner comprises at least one of a crank and a motor.

14. The restraint system in accordance with claim 13, wherein the belt pretensioner includes at least one of a toothed gear and a belt.

15. The restraint system in accordance with claim 1, wherein the actuator is configured for manual operation of the at least one belt.

16. The restraint system in accordance with claim 1, wherein the at least one belt-adjusting mechanism is configured as a belt retractor.

17. The restraint system in accordance with claim 1, wherein the actuator is configured to be actuated and/or triggered by an operator for a duration of use.

18. The restraint system in accordance with claim 1, wherein the at least one belt-adjusting mechanism is configured to preadjust the length of the belt and to arrest the belt by a passenger.

19. A restraint system for use in a vehicle, comprising:
- a seat; a belt system having at least one belt and at least one belt-adjusting mechanism; and at least one buckle;
- wherein the at least one belt-adjusting mechanism is disposed at a first side of the seat and the at least one buckle is disposed at a second side of the seat;
- an end portion of the at least one belt is connected to the at least one belt-adjusting mechanism; and
- the belt system has a locking member for locking with the at least one buckle;
- further wherein the restraint system has a belt pretensioner, which comprises: a force transmission member; and an actuator configured to actuate the force transmission member for tightening the force transmission member and/or the at least one belt;
- the actuator being configured to be actuated and/or triggered by an operator;
- wherein the restraint system is configured such that the at least one belt-adjusting mechanism becomes or is blocked if the at least one buckle becomes locked, and/or the at least one belt-adjusting mechanism becomes or is unlocked if the at least one buckle is disengaged from a tongue plate.

20. A restraint system for use in a vehicle, comprising:
- a seat; a belt system having at least one belt and at least one belt-adjusting mechanism; and at least one buckle;
- wherein the at least one belt-adjusting mechanism is disposed at a first side of the seat and the at least one buckle is disposed at a second side of the seat;
- an end portion of the at least one belt is connected to the belt-adjusting mechanism; and
- the belt system has a locking member for locking with the at least one buckle;
- further wherein the restraint system has a belt pretensioner, which comprises: a force transmission member; and an actuator configured to actuate the force transmission member for tightening the force transmission member and/or the at least one belt;
- the actuator being configured to be actuated and/or triggered by an operator;
- wherein the belt pretensioner comprises a backstop configured to block at least one direction of movement of the force transmission member; and
- wherein the backstop comprises a position element which is connected to the force transmission member, and a locking element configured for engagement with the position element.

* * * * *